(12) United States Patent
Oigawa

(10) Patent No.: US 10,664,984 B2
(45) Date of Patent: May 26, 2020

(54) DISTANCE MEASURING APPARATUS AND DISTANCE MEASURING METHOD

(71) Applicant: CANON KABUSHIKI KAISHA, Tokyo (JP)

(72) Inventor: Makoto Oigawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 16/152,694

(22) Filed: Oct. 5, 2018

(65) Prior Publication Data
US 2019/0108649 A1  Apr. 11, 2019

(30) Foreign Application Priority Data

Oct. 11, 2017 (JP) ................. 2017-197539

(51) Int. Cl.
| | | |
|---|---|---|
| *G06T 7/593* | (2017.01) | |
| *G06T 7/73* | (2017.01) | |
| *G06T 7/32* | (2017.01) | |
| *H04N 13/232* | (2018.01) | |
| *H04N 13/218* | (2018.01) | |
| *H04N 13/239* | (2018.01) | |
| *H04N 13/00* | (2018.01) | |

(52) U.S. Cl.
CPC ............... *G06T 7/593* (2017.01); *G06T 7/32* (2017.01); *G06T 7/74* (2017.01); *H04N 13/218* (2018.05); *H04N 13/232* (2018.05); *G06T 2207/10012* (2013.01); *G06T 2207/20216* (2013.01); *G06T 2207/20224* (2013.01); *H04N 13/239* (2018.05); *H04N 2013/0081* (2013.01)

(58) Field of Classification Search
None
See application file for complete search history.

(56) References Cited

U.S. PATENT DOCUMENTS

| | | | | |
|---|---|---|---|---|
| 2011/0096171 A1* | 4/2011 | Kimura | ............... | G02B 7/34 348/187 |
| 2014/0168662 A1* | 6/2014 | Takabayashi | ...... | G01B 11/2513 356/610 |

(Continued)

FOREIGN PATENT DOCUMENTS

JP        2013190734 A        9/2013

*Primary Examiner* — Kate H Luo
(74) *Attorney, Agent, or Firm* — Rossi, Kimms & McDowell LLP

(57) ABSTRACT

A distance measuring apparatus includes: an image pickup element in which a plurality of pixels receives light of an image are two-dimensionally arrayed; and an acquiring unit acquires information relating to a distance to an object based on an output signal of the image pickup element which each pixel line is constituted by pixels which receive beams passing through a same pupil region of the imaging optical system, and wherein the acquiring unit (1) acquires a first image displacement amount from output signals of at least two pixel lines which receive beams passing through a same pupil region, (2) acquires a second image displacement amount from output signals of at least two pixel lines which receive beams passing through different pupil regions, and (3) acquires the information relating to the distance to the object based on the first image displacement amount and the second image displacement amount.

15 Claims, 13 Drawing Sheets

(56) References Cited

U.S. PATENT DOCUMENTS

2014/0320610 A1* 10/2014 Oigawa ................ H04N 13/239
                                                    348/47
2015/0201121 A1*  7/2015 Nobayashi ............. G02B 7/34
                                                    348/222.1
2015/0319357 A1* 11/2015 Oigawa .................... G02B 7/34
                                                    348/352

* cited by examiner

FIRST PIXEL

SECOND PIXEL

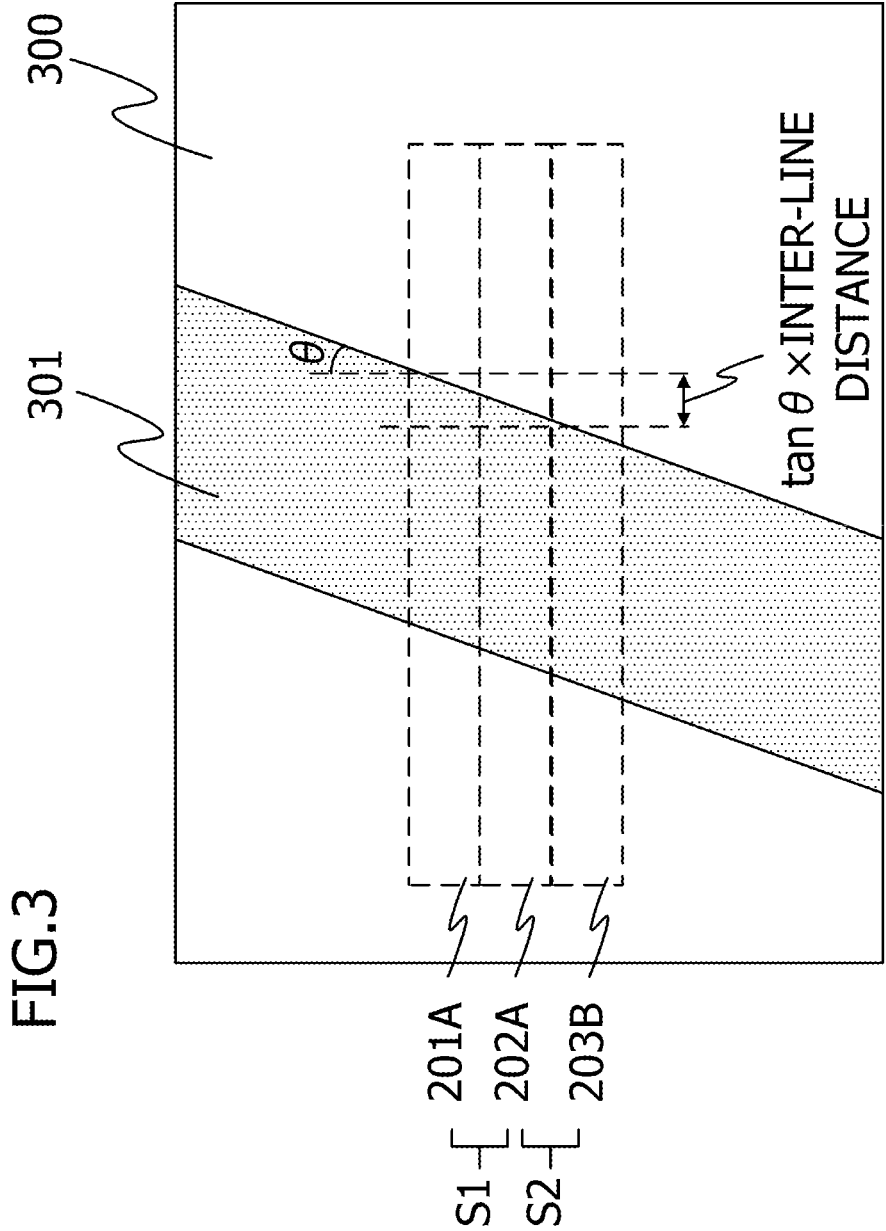

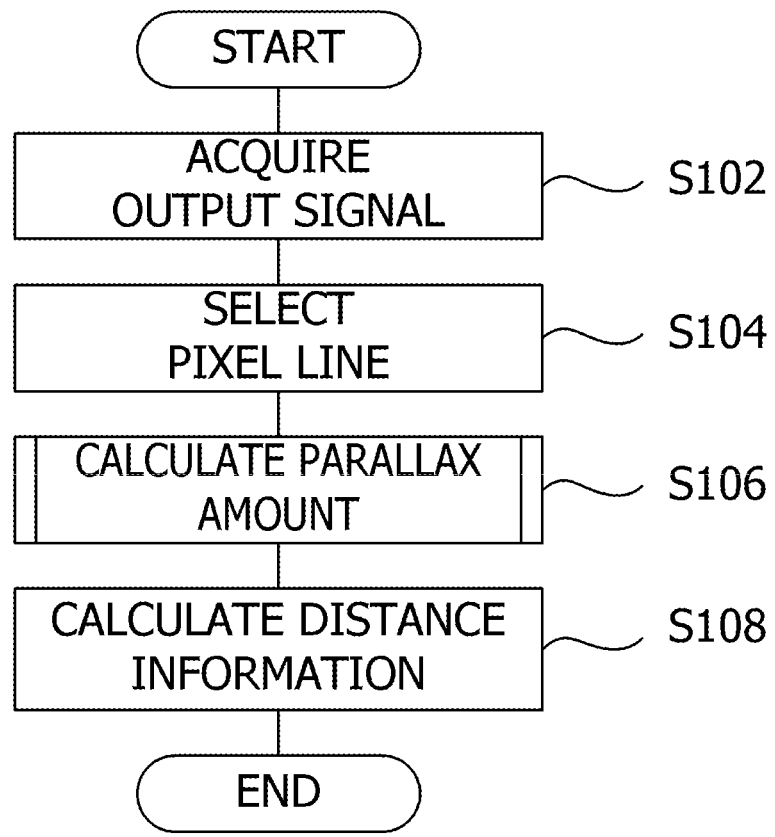

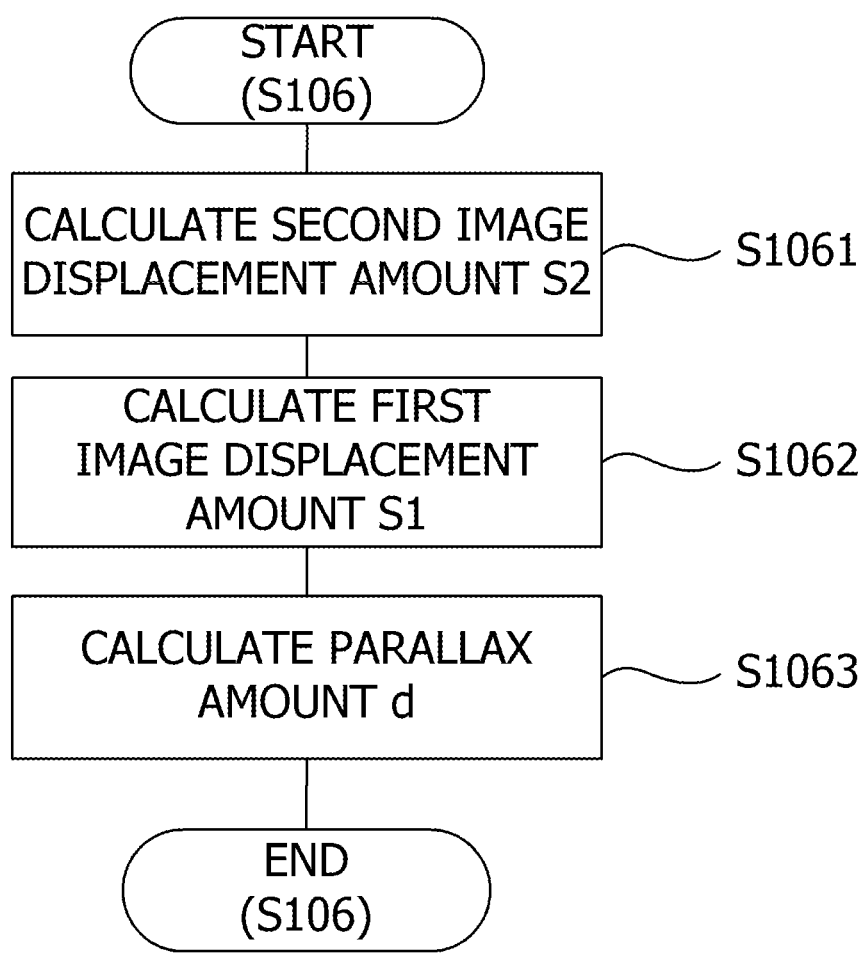

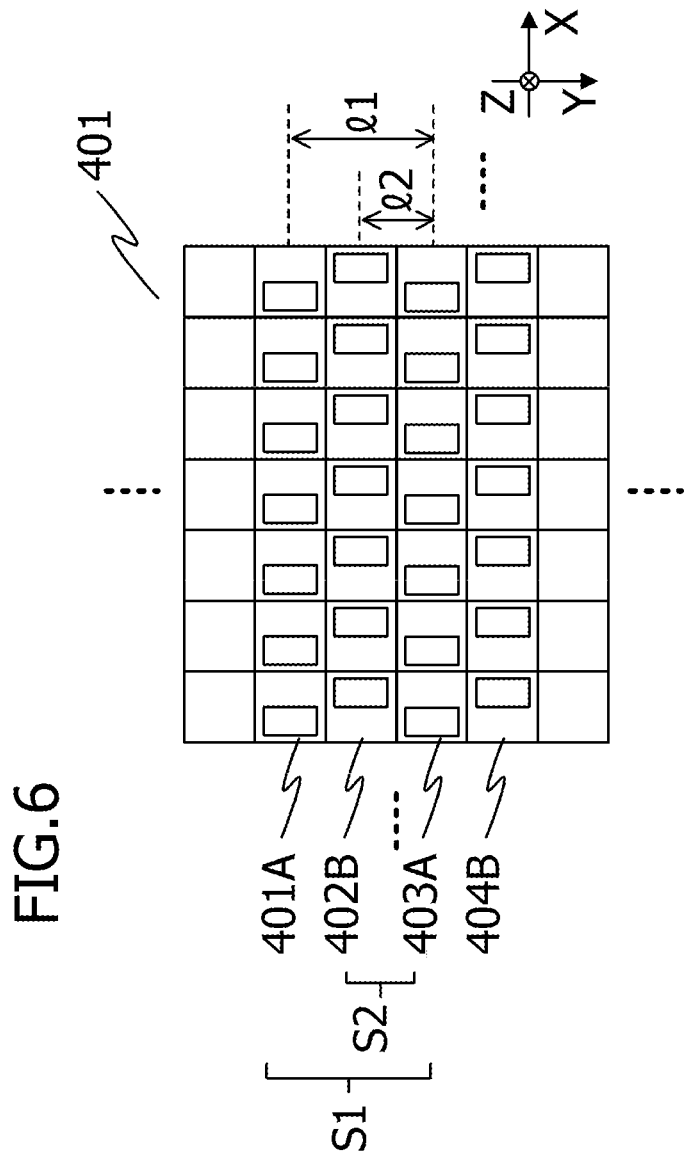

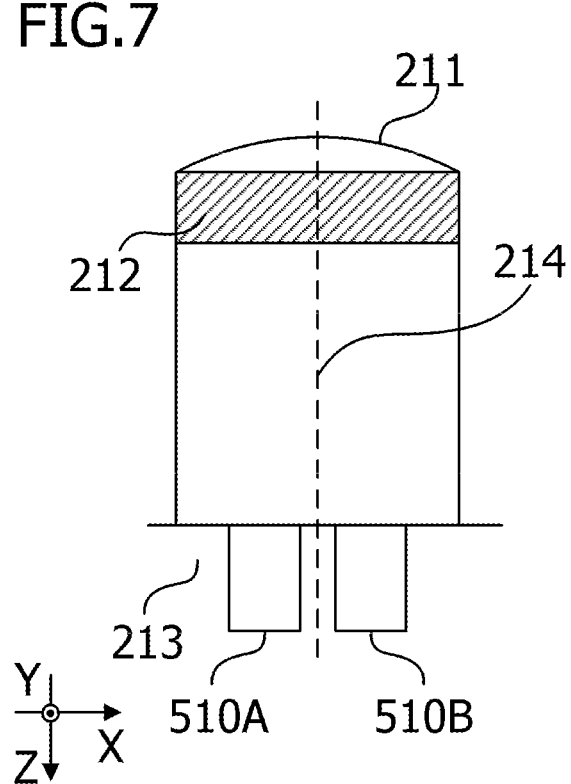

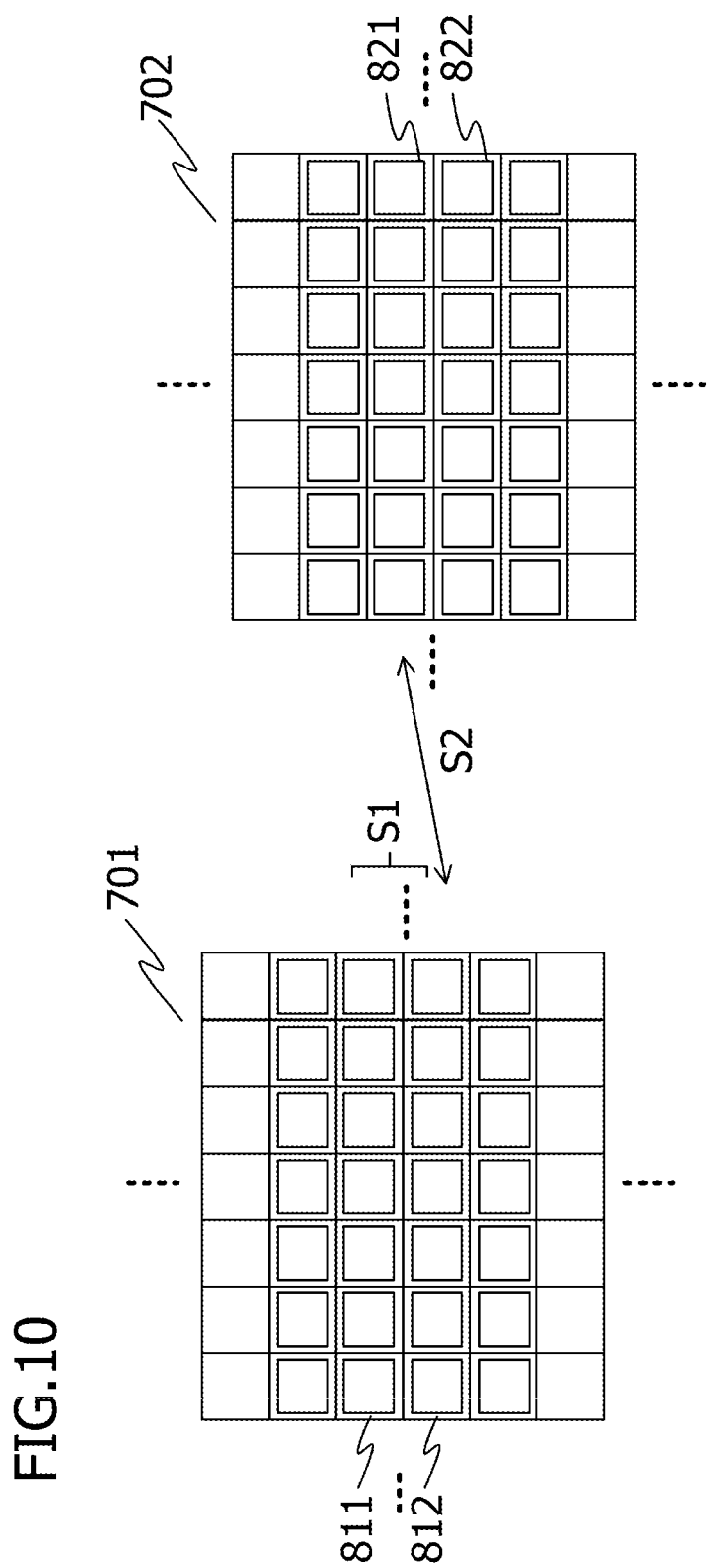

DISTANCE MEASURING APPARATUS AND DISTANCE MEASURING METHOD

BACKGROUND OF THE INVENTION

Field of the Invention

The present invention relates to a distance measuring apparatus and a distance measuring method.

Description of the Related Art

As a distance method used for a digital single-lens reflex camera and the like, a method of calculating information relating to the distance to an object, using a parallax amount determined from correlation values among a plurality of images having parallax, is frequently used (phase difference distance measuring method). In concrete terms, the parallax amount is measured as a displacement amount among a plurality of images with respect to the pixel coordinates, and this displacement amount is also called the "image displacement amount".

A correlation value is determined by extracting a part of each image as a comparing region, and performing the correlation operation. Here if the comparing regions among the images are different portions of the object, a value other than the parallax amount to be determined is included in the calculated correlation value. For example, in the case of an object of which the comparing regions are vertically shifted and has a diagonal edge, the displacement amount of the inter-line distance×tan θ is included in the calculated correlation value.

Japanese Patent Application Publication No. 2013-190734 discloses a technique to correct the displacement amount by adding and averaging each correlation value between a reference pixel line on an image pickup element, and a pixel line, which is constituted by pixels of which aperture profiles (sensitivity distribution) are different, and are disposed above and below the reference pixel line.

In Japanese Patent Application Publication No. 2013-190734, however the aperture profile of a pixel in the reference pixel reading line and the aperture profiles of pixels in the above and below reading lines need to be different. Furthermore, the pixels in the above and below reading lines need to have the same aperture profiles, which restrict designing to arrange pixels in the image pickup element.

SUMMARY OF THE INVENTION

With the foregoing in view, it is an object of the present invention to provide a technique in which, while maintaining the equivalent effect, to that of the prior art, of correcting the displacement amount included in the correlation values, generated when the comparing regions of the images of an object are different, restrictions on the pixel arrangement can be relaxed, and in which design flexibility can be improved.

The present invention in its first aspect provides a distance measuring apparatus comprising:

an image pickup element including a plurality of pixels, wherein the plurality of pixels are configured to receive light of an image formed by an imaging optical system and are two-dimensionally arrayed;

a memory storing a program; and
at least one processor executing the program to operate as:
an acquiring unit configured to acquire information relating to a distance to an object based on an output signal of the image pickup element, wherein each pixel line of the image pickup element is constituted by pixels which receive beams passing through a same pupil region of the imaging optical system, and wherein the acquiring unit is further configured to (1) acquire a first image displacement amount from output signals of at least two pixel lines which receive beams passing through a same pupil region, (2) acquire a second image displacement amount from output signals of at least two pixel lines which receive beams passing through different pupil regions, and (3) acquire the information relating to the distance to the object based on the first image displacement amount and the second image displacement amount.

The present invention in its second aspect provides a distance measuring method comprising:

acquiring an output signal of an image pickup element including a plurality of pixels, wherein the plurality of pixels are configured to receive light of an image formed by an imaging optical system and are two-dimensionally arrayed, and each pixel line is constituted by pixels which receive beams passing through a same pixel region of the imaging optical system;

acquiring a first image displacement amount from output signals of at least two pixel lines which receive beams passing through a same pupil region;

acquiring a second image displacement amount from output signals of at least two pixel lines which receive beams passing through different pupil regions; and determining information relating to a distance to an object based on the first image displacement amount and the second displacement amount.

The present invention in its third aspect provides a non-transitory computer readable medium that stores a program, wherein the program causes a computer to execute: a distance measuring method comprising:

acquiring an output signal of an image pickup element including a plurality of pixels, wherein the plurality of pixels are configured to receive light of an image formed by an imaging optical system and are two-dimensionally arrayed, and each pixel line is constituted by pixels which receive beams passing through a same pixel region of the imaging optical system;

acquiring a first image displacement amount from output signals of at least two pixel lines which receive beams passing through a same pupil region;

acquiring a second image displacement amount from output signals of at least two pixel lines which receive beams passing through different pupil regions; and determining information relating to a distance to an object based on the first image displacement amount and the second displacement amount.

According to the present invention, while maintaining the equivalent effect, to that of the prior art, of correcting the displacement amount included in the correlation values, generated when the comparing regions of the images of an object are different, restrictions on the pixel arrangement can be relaxed, and design flexibility can be improved.

Further features of the present invention will become apparent from the following description of exemplary embodiments with reference to the attached drawings.

BRIEF DESCRIPTION OF THE DRAWINGS

FIG. 3 is a diagram depicting an example of a captured image according to First embodiment of the present invention;

FIG. 4 is a flow chart depicting an example of a distance measuring processing according to First embodiment of the present invention;

FIG. 5 is a flow chart depicting an example of a parallax amount calculating processing according to First embodiment of the present invention;

FIG. 6 is a diagram depicting an example of an image pickup element according to First modification of First embodiment of the present invention;

FIG. 7 is a diagram depicting an example of a pixel of an image pickup element according to Second modification of First embodiment of the present invention;

FIG. 10 is a diagram depicting an example of an image pickup element according to Third embodiment of the present invention;

DESCRIPTION OF THE EMBODIMENTS

First Embodiment

First embodiment of the present invention will be described.

<General Configuration>

Figure 1:
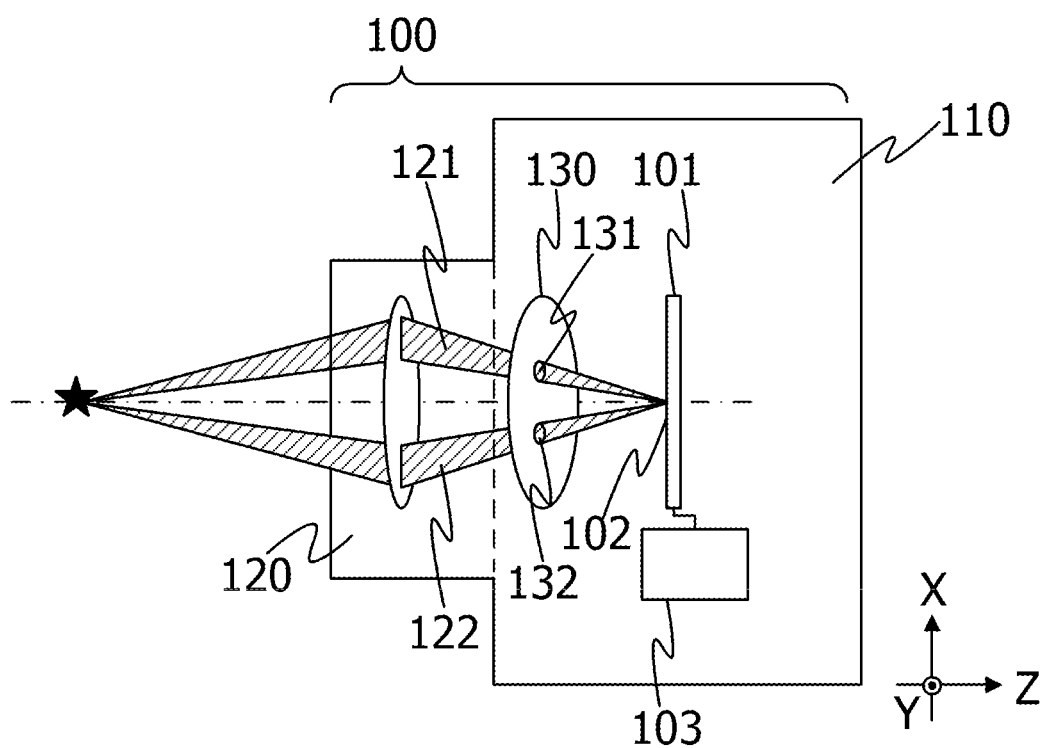
FIG. 1 is a diagram depicting an example of a distance measuring apparatus according to First embodiment of the present invention.

FIG. 1 is a diagram depicting a configuration example of a distance measuring apparatus 100 according to First embodiment. The distance measuring apparatus 100 according to First embodiment includes a camera 110 and an imaging optical system 120. The camera 110 includes an image pickup element 101, an arithmetic processing unit 103 (acquiring unit) and the like. In the image pickup element 101, a plurality of pixels 102, which receive the light of the image formed by the imaging optical system 120, are two-dimensionally arrayed. Each pixel 102 is configured to have a light-receiving sensitivity characteristics in accordance with an incident angle of the light, so as to acquire a parallax image.

The arithmetic processing unit 103 may be constituted by a logic circuit, such as an application specific integrated circuit (ASIC). Alternatively, the arithmetic processing unit 103 may be constituted by a central processing unit (CPU) and a memory which stores an arithmetic processing program. In First embodiment, the arithmetic processing unit 103 acquires information relating to the distance to an object (indicated by a star) based on the output signal of the image pickup element 101.

Configuration of Image Pickup Element

The image pickup element 101 is constituted by a complementary metal-oxide semiconductor (CMOS) or a charge coupled device (CCD), and has a distance measuring function based on the imaging plane phase difference distance measuring method. An object image formed on the image pickup element 101 via the imaging optical system 120 is converted into an image signal by a photoelectric converting unit of the image pickup element 101. If development process is performed on the acquired image signal by the arithmetic processing unit 103, an image signal for viewing can be generated. The generated image for viewing may be stored in memory. The image pickup element corresponds to an image acquiring unit that acquires an image signal for viewing and an image signal used for distance measurement.

In First embodiment, the image pickup element 101 includes a first pixel, which receives a first beam 121 passing through a first pupil region 131, out of an exit pupil 130 of the imaging optical system 120. The image pickup element 101 also includes a second pixel, which receives a second beam 122 passing through a second pupil region 132, which is a region that is different from the first pupil region 131, out of the exit pupil 130 of the imaging optical system 120.

Figure 2A:
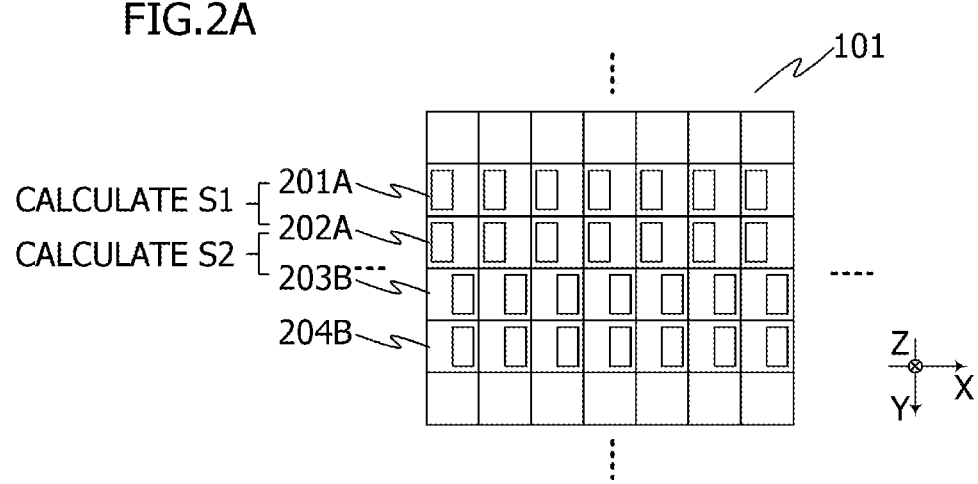
FIG. 2A to FIG. 2C are diagrams depicting an example of an image pickup element according to First embodiment of the present invention.

FIG. 2A is a diagram depicting a configuration example of the image pickup element 101 according to First embodiment. The image pickup element 101 includes pixel lines (201A and 202A) where the first pixels are arranged in the x direction, and pixel lines (203B and 204B) where the second pixels are arranged in the x direction. Hereafter a pixel line constituted by the first pixels is called the "first pixel line", and a pixel line constituted by the second pixels is called the "second pixel line". In the other regions of the image pickup element 101 as well, two first pixel lines and two second pixel lines are alternately disposed. The direction of arranging the pixel lines is not limited to the x direction. For example, the pixel lines may be arranged in the y direction. The arranging direction of the pixel lines (x direction in First embodiment) can be any direction as long as the correspondence of the first and second pixels (in First embodiment, light-receiving sensitivity characteristics are different in x direction) is maintained in the same direction.

Figure 2B:
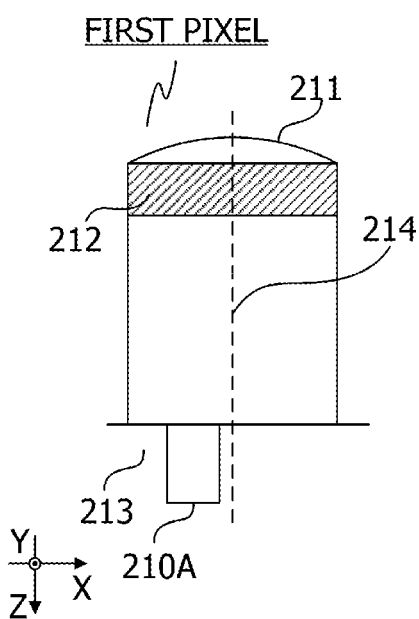
Figure 2C:
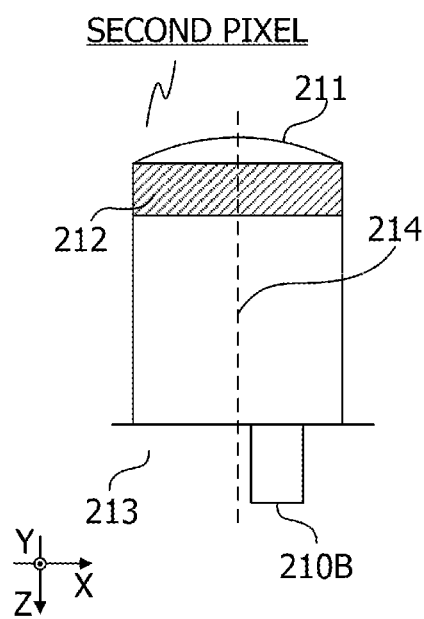

FIG. 2B and FIG. 2C are diagrams depicting configuration examples of the first pixel and the second pixel of First embodiment respectively. Each pixel 102 includes: a microlens 211 which efficiently guides a beam entered the pixel into a photoelectric converting unit; a color filter 212 which allows a light having a predetermined wavelength band to pass; and a photoelectric converting unit 210 (210A or 210B) which preforms photoelectric conversion on the received light, among other components. The photoelectric converting unit 210 is formed on a substrate 213, and has a sensitivity to detect a target wavelength band. In First embodiment, the photoelectric converting unit 210 is disposed in a position that is shifted from the center line 214 of each pixel 102 in the ±x directions, and each pixel has light-receiving sensitivity characteristics in accordance with the incident angle of the receiving light.

The photoelectric converting unit 210A generates an image signal (output signal) by performing photoelectric conversion on the received first beam 121. In the same manner, the photoelectric converting unit 210B generates an image signal by performing photoelectric conversion on the received second beam 122. Thereby, by using the image signals of the photoelectric converting unit 210A, the arithmetic processing unit 103 can acquire an intensity distribution of an image which is formed on the image pickup element 101 by the beam passing mainly through the first pupil region 131. Further, by using the image signals of the photoelectric converting unit 210B, the arithmetic processing unit 103 can acquire an intensity distribution of an image which is formed on the image pickup element 101 by the beam passing mainly through the second pupil region 132.

Each pixel 102 has a spectral characteristic of red, green and blue (RGB) or infrared (IR) in accordance with the wavelength band detected by the color filter 212, and is arranged on the xy plane according to a known color arrangement pattern (not illustrated). Each pixel 102 also includes wiring (not illustrated) for reading an image and driving the pixel.

<Displacement Amount Included in Correlation Value>

In First embodiment, the parallax amount is determined from the correlation value of the output signals of the first pixel line and the second pixel line, and the distance information is acquired from this parallax amount by a known method. The correlation value is determined by extracting a part of the region of each image as a comparing region, and performing correlation calculation.

It is ideal if the parallax amount in the line direction (horizontal direction) is determined using a correlation value of output signals of pixels which are located on a same pixel line (vertical position) but which have different aperture profiles. However, if pixels having the different aperture profile cannot be disposed on the same pixel line due to the process, design or the like of the image pickup element 101, the pixels on the same pixel line do not have parallax, hence the pixels on different pixel lines need to be compared. But a correlation value calculated using different pixel lines may include a later mentioned displacement amount, in addition to the parallax amount to be determined. A case of generating the displacement amount in First embodiment will be described using an example of an object illustrated in FIG. 3.

FIG. 3 indicates a captured image 300 according to First embodiment. As illustrated in FIG. 3, an edge (edge component) of the object 301 has an angle θ with respect to a direction that is vertical to the line direction of the image pickup element 101. In this case, a second image displacement amount $s_2$, calculated between the first pixel line 202A and the second pixel line 203B, includes the displacement amount of tan θ×inter-line distance, caused by deviation of the position of each comparing region from the object, in addition to the parallax to be determined.

To correct this displacement amount, the arithmetic processing unit 103 performs the correlation operation between 201A and 202A which are both first pixel lines, and corrects a second image displacement amount $s_2$ by using the first image displacement amount $s_1$ determined by using the calculated correlation value. The first image displacement amount $s_1$ is an image displacement amount determined by the correlation operation between output signals which are generated from first pixels having the same aperture profile (sensitivity distribution), and therefore does not include the parallax amount. In other words, $s_1$ includes only the displacement amount of tan θ×inter-line distance, caused by displacement of one comparing region to perform the correlation operation by one line with respect to the object. The actual processing flow of the arithmetic processing unit 103 will be described with reference to the flow chart in FIG. 4.

<Acquiring Distance Information>

First, the arithmetic processing unit 103 acquires output signals (image signals) of the image pickup element 101 (S102). Then the arithmetic processing unit 103 selects pixel lines used for the correlation operation (S104). In First embodiment, the arithmetic processing unit 103 selects the first pixel lines 201A and 202A and the second pixel line 203B as the pixel lines used for the correlation operation. Then the arithmetic processing unit 103 determines the parallax amount d based on the correlation value of the output signals of the first pixel lines 201A and 202A and the second pixel line 203B (S106). To calculate the correlation value, a known method called normalized cross-correlation (NCC), which evaluates the normalized cross-correlation among the output signals, may be used, for example. Details on the method of calculating the parallax amount will be described when the processing depicted in the flow chart in FIG. 5 is described.

The arithmetic processing unit 103 calculates the distance between the object and the distance measuring apparatus based on the parallax amount d (S108). The distance between the object and the distance measuring apparatus will be called the "object distance" in the following. First, the arithmetic processing unit 103 converts the parallax amount d into a defocus amount, which is a distance from the image pickup element 101 to the focal point of the imaging optical system 120, by using a predetermined conversion coefficient. The conversion coefficient can be determined from the dependency of the light-receiving sensitivity of the pixel of the image pickup element 101 on the incident angle, the shape of the exit pupil 130, and the distance from the image pickup element 101 to the exit pupil 130. When the predetermined conversion coefficient is "Gain", the defocus amount is ΔL and the parallax amount is d, the image displacement amount d can be converted into the defocus amount ΔL by the following Expression (1).

$$\Delta L = \text{Gain} \times d \quad (1)$$

Conversion from the defocus amount ΔL on the image side to the distance on the object side (object distance) can be easily performed by using the image forming relationship of the imaging optical system 120.

In the above description, the parallax amount d is converted into the defocus amount first by using Expression (1), and is then converted into the object distance, but the parallax amount d may be directly converted into the object distance by one conversion processing. Thereby the calculating amount to convert into the object distance can be decreased. The information representing the distance of the object is not limited to the object distance, but may be any value which can be converted into the object distance. For example, the parallax amount d, the defocus amount or a value that is generated by normalizing these values by using a predetermined constant may be used as the information representing the distance of the object.

<Calculating Parallax Amount>

A specific processing content, when the arithmetic processing unit 103 calculates the image displacement amount, will be described with reference to the flow chart in FIG. 5.

The arithmetic processing unit 103 calculates a second image displacement amount $s_2$ from the output signals of pixel lines (202A and 203B) which receive beams passing through different pupil regions (S1061). Further, the arithmetic processing unit 103 calculates a first image displacement amount $s_1$ from the output signals of pixel lines (S201A and 202A) which receive beams passing through a same pupil region (S1062). Then the arithmetic processing unit 103 calculates the parallax amount d from the first image displacement amount $s_1$ and the second image displacement amount $s_2$ by using the following Expression (2) (S1063).

$$d = s_2 - s_1 \quad (2)$$

It is preferable that the pixel lines used for calculating the first image displacement amount $s_1$ or the second image displacement amount $s_2$ are adjacent or close to each other, as in First embodiment, since the pattern of the object can be regarded as the same in these lines, but selection of the pixel lines used for calculating the image displacement amount is not especially limited. For example, the arithmetic processing unit 103 may select pixel lines disposed distant from each other, for the pixel lines used for calculating the first image displacement amounts $s_1$ and the second image displacement amount $s_2$. The correction effect can be implemented only if the displacement amounts of the lines are correlated with the difference of the comparing regions for a pattern of the object. The pixel lines to calculate the first image displacement amount $s_1$ (or the second image displacement amount $s_2$) may be disposed distant from each other.

The term "adjacent" here includes a case when two pixel lines are disposed right next to each other, and a case when the two pixel lines having the same aperture profile are closest to each other, among all the pixel lines having the same aperture profile, even if pixel lines having different profiles exist therebetween.

Considering a case of superimposing various noises on a captured image, the arithmetic processing unit 103 may determine the first image displacement amount $s_1$ (correction value) by averaging. In this case, the arithmetic processing unit 103 first determines the average value of the first image displacement amount $s_{1a}$ which is determined from the first pixel lines 201A and 202A, and the first image displacement amount $s_{1b}$ which is determined from the second pixel lines 203B and 204B. Then the parallax amount d can be determined by the following Expression (3) by using the determined average value.

$$d = s_2 - \frac{s_{1a} + s_{1b}}{2} \quad (3)$$

Here an arithmetic mean is determined, but a geometric mean or the like may be determined. Further, the average of two first image displacement amounts is determined here, but three or more first image displacement amounts may be used. By performing various smoothings in this way, the influence of various noises can be reduced.

In First embodiment, an example of using the pixel lines located above the pixel line used for calculating the second image displacement amount $s_2$ and the pixel lines located below thereof was described, but selection of the pixel lines is not especially limited. For example, the arithmetic processing unit 103 may determine the parallax amount d by using an average of a plurality of first image displacement amounts based on the output signals of the pixel lines located above the pixel line used for calculating the second image displacement amount $s_2$. The combination of the pixel lines located above or below the pixel line used for calculating the second image displacement amount $s_2$ may or may not include the pixel line used for calculating the second image displacement amount $s_2$.

According to First embodiment described above, while maintaining the equivalent effect, to that of the prior art, of correcting the displacement amount of the correlation values, generated when the target pixel lines of the correlation operation are different, restrictions on the pixel arrangement on the image pickup element can be relaxed, and design flexibility to arrange pixels can be improved.

(First Modification of First Embodiment)

In First embodiment described above, two lines of the first pixel lines and two lines of the second pixel lines are disposed respectively, but in First modification, the first pixel line and the second pixel line are alternately disposed.

FIG. 6 indicates an image pickup element 401 according to First modification. In the image pickup element 401, first pixel lines 401A and 403A and second pixel lines 402B and 404B are alternately disposed. In the other regions of the image pickup element 401 as well, the first pixel line and the second pixel line are alternately disposed. The arithmetic processing unit 103 performs the correlation operation between the output signals from the first pixel lines 401A and 403A, so as to calculate a first image displacement amount $s_1$. Further, the arithmetic processing unit 103 performs the correlation operation between the output signals from the first pixel line 403A and the second pixel line 402B, so as to calculate a second image displacement amount $s_2$. In this case, the parallax amount d is calculated by the following Expression (4).

$$d = s_2 - \frac{s_1}{L} \quad (4)$$

Here L is a ratio of: the line space $l_1$ between the set of pixel lines used for calculating the first image displacement amount; and the line space $l_2$ between the set of pixel lines used for calculating the second image displacement amount, and is calculated by the following Expression (5).

$$L = \frac{\ell_1}{\ell_2} \quad (5)$$

It is also preferable to determine the first image displacement amount $s_1$ by averaging, as mentioned above. In this case, the arithmetic processing unit 103 performs the correlation operation between the first pixel lines 401A and 403A, and determines the first image displacement amount $s_{1a}$ from the calculated correlation value. Then, in the same manner, the arithmetic processing unit 103 performs the correlation operation between the second pixel lines 402B and 404B, and determines a first image displacement amount $s_{1b}$ from the calculated correlation value. The parallax amount d can be determined by the following Expression (6) by using these determined values.

$$d = s_2 - \frac{s_{1a} + s_{1b}}{2L} \quad (6)$$

(Second Modification of First Embodiment)

In First embodiment, an example of using each pixel that is used receives either the first beam 121 or the second beam 122 was described, but a pixel which receives both the first beam and the second beam may be disposed on the entire surface of the image pickup element.

FIG. 7 is a cross sectional view of a pixel according to Second modification. This pixel has photoelectric converting units 510A and 510B, and acquires a signal by separating the first beam and the second beam within the same pixel. By using this pixel, the arithmetic processing unit 103 acquires the first output signal and the second output signal from the same line, and performs the correlation operation, and as a result the above mentioned displacement amount is not generated. However, in terms of the signal reading speed, it is preferable that the arithmetic processing unit 103 acquires the first output signal or the second output signal separately from each line. In this case, the comparing regions of the object deviate between lines, however the parallax amount d can be calculated by using the above mentioned correction method according to the output signal from the reading line.

(Third Modification of First Embodiment)

The first pixel and the second pixel of First embodiment may have a light shield film in the pixel structure. By this configuration, the light-receiving sensitivity characteristics in accordance with the incident angle can be provided, hence an effect similar to the first pixel and the second pixel according to First embodiment can be implemented. This configuration is advantageous in terms of cost reduction, since the same ion implantation process into the substrate 213 can be used for the first pixel and the second pixel.

(Fourth Modification of First Embodiment)

The above mentioned second image displacement amount $s_2$ includes the image displacement error caused by a difference of the remaining PSF profile. This image displacement error may be corrected by a known method (e.g. performing deconvolution operation on the PSF).

Here the above mentioned first image displacement amount $s_1$ does not include the image displacement amount caused by the difference of the PSF profile, since pixel lines constituted by pixels of which aperture profiles are the same are used to determine the first image displacement amount $s_1$. This will be described with reference to FIG. 11A to FIG. 13B.

Figure 11A:
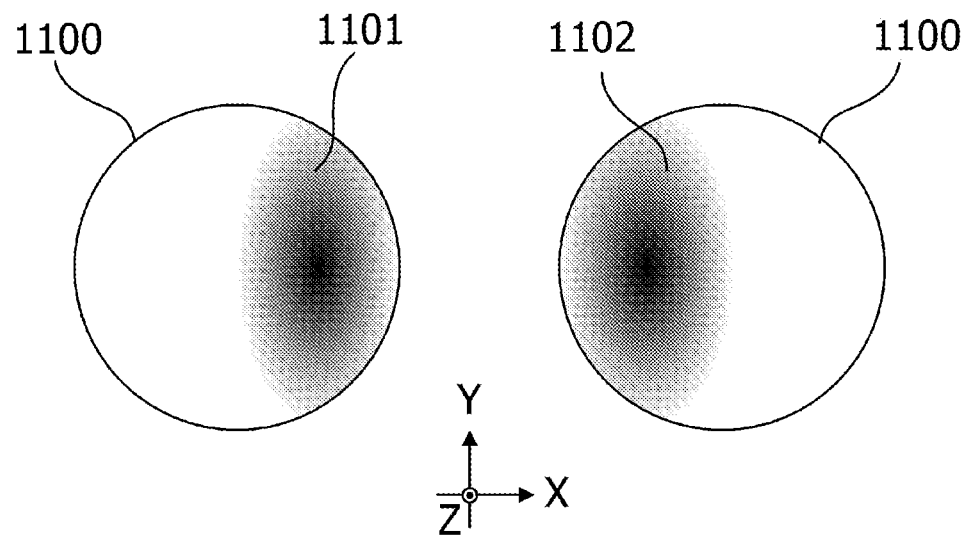
FIG. 11A and FIG. 11B are diagrams depicting an example of the sensitivity characteristics of an image pickup element according to an embodiment of the present invention.
Figure 11B:
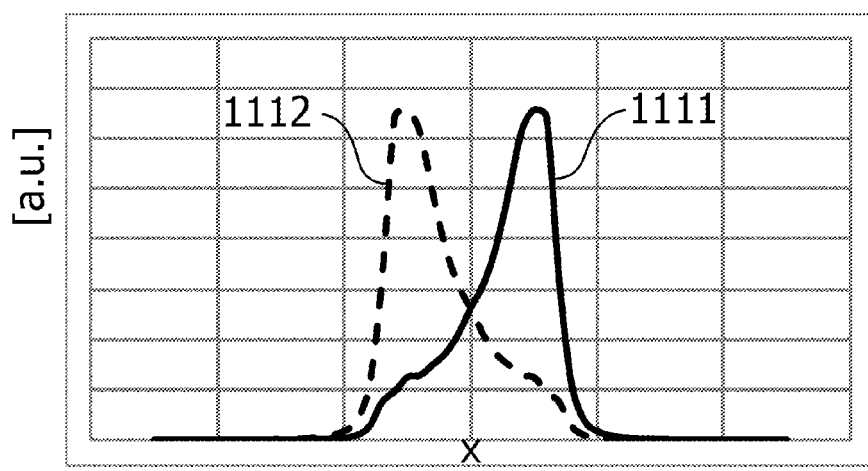

FIG. 11A indicates the sensitivity characteristics of each pixel 102 reflected in the exit pupil 130, and a region having higher light-receiving sensitivity is indicated with a darker color as indicated in the sensitivity characteristic 1101 of the first pixel and the sensitivity characteristic 1102 of the second pixel respectively. FIG. 11B is a diagram depicting a cross section of the PSF of each pixel 102 in the x direction in a predetermined defocused state. In FIG. 11B, the solid line indicates the PSF cross section 1111 of the first pixel, and the broken line indicates the PSF cross section 1112 of the second pixel. Since the light-receiving sensitivity characteristic (aperture profile) of the pixels are different from each other in this way, the center of gravity in the sensitivity distribution profile in the exit pupil 130 of the first pixel deviates from that of the second pixel, and the PSF profiles of the first and second pixels become asymmetric. As a result, each output signal used for the correlation operation has a profile of the object in which this PSF is convolved. For the object 301 illustrated in FIG. 3, the output signal acquired by the pixel line constituted by each pixel 102 will be described as an example.

Figure 12A:
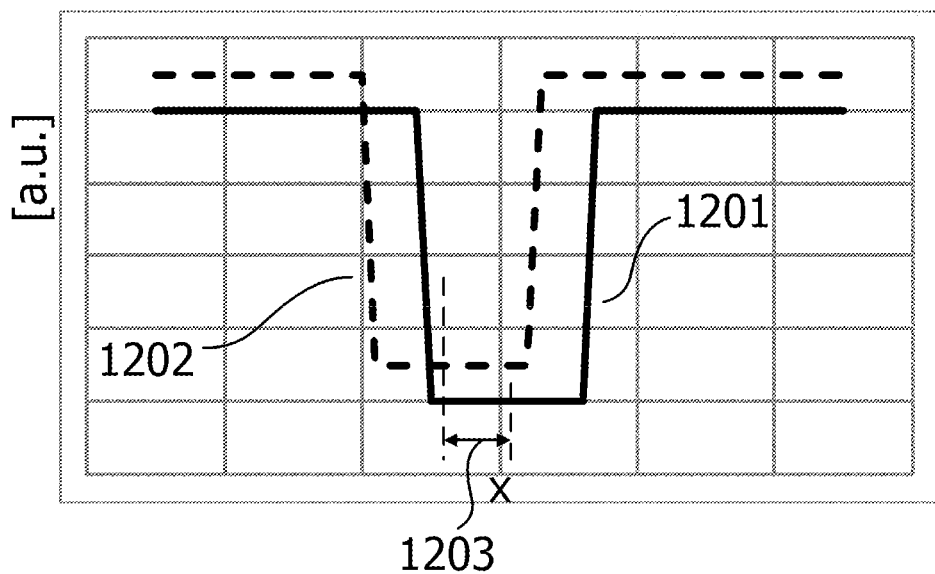
FIG. 12A and FIG. 12B are diagrams depicting an example of the sensitivity characteristics of an image pickup element according to an embodiment of the present invention.
Figure 12B:
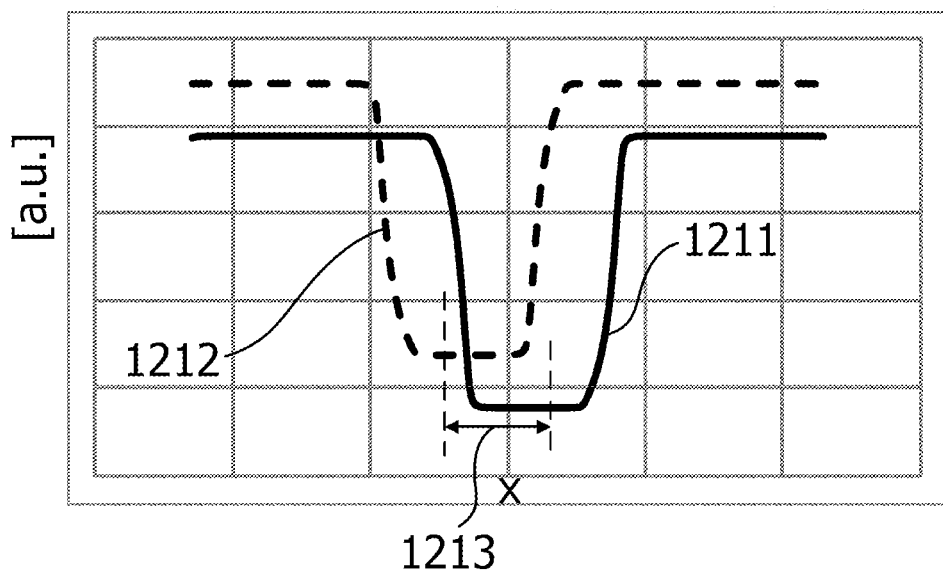

FIG. 12A and FIG. 12B indicate the output signals of two pixel lines of which aperture profiles are different. FIG. 12A indicates an output signal (profile of the object 301) in which the influence of the PSF profile is not included. The solid line 1201 indicates an output signal of the first pixel line 202A, and the broken line 1202 indicates the object profile at the position of the second pixel line 203B. For convenience, in the following graphs, these profiles are indicated deviating from each other in the ordinate direction.

FIG. 12B indicates the output signals in which the PSF of each pixel 102 is convolved. The solid line 1211 indicates an output signal of the first pixel line 202A, and is a signal generated by convolving the PSF profile 1111 of the first pixel with the solid line 1201. The broken line 1212 indicates an output signal of the second pixel line 203B, and is a signal generated by convolving the PSF profile 1112 of the second pixel with the broken line 1202. Since the PSF profiles 1111 and 1112 are asymmetric and have different profiles, the gravity center space 1213 of the output signals are different from the gravity center space 1203 of the output signals indicated in FIG. 12A.

Therefore the correction value includes the influence of the aperture profile, unlike the tan θ×inter-line distance that is geometrically determined when the correlation operation is performed using the output signals from the pixels of which aperture profiles (PSF profiles) are different, and the correction value of the change of the object profile caused by the line displacement of the comparing regions is calculated. Therefore in the case when the pixels which output a set of signals to perform the correlation operation are from a set of lines of which aperture profiles are different, the correlation values include different values as an influence of the aperture profile, depending on the combination of the pixels having different aperture profiles.

Figure 13A:
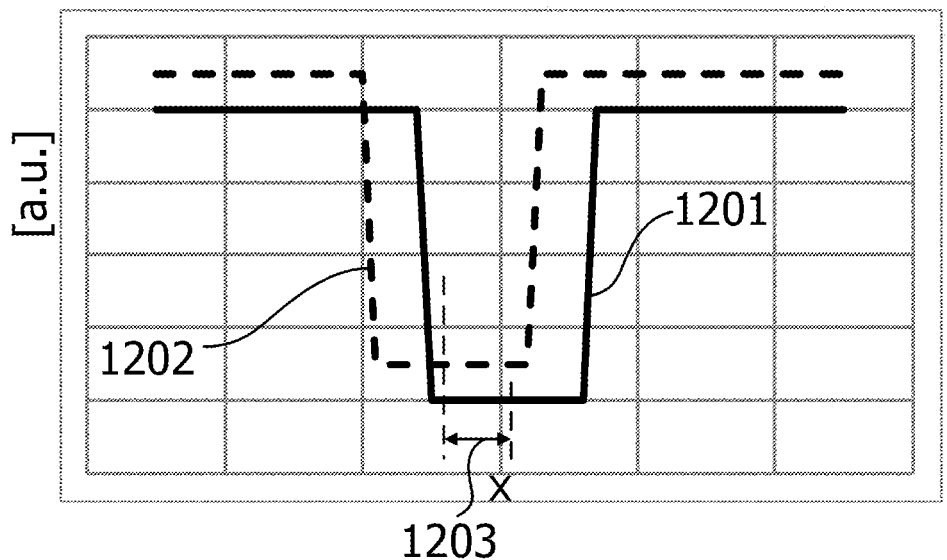
FIG. 13A and FIG. 13B are diagrams depicting an example of the sensitivity characteristics of an image pickup element according to an embodiment of the present invention.
Figure 13B:
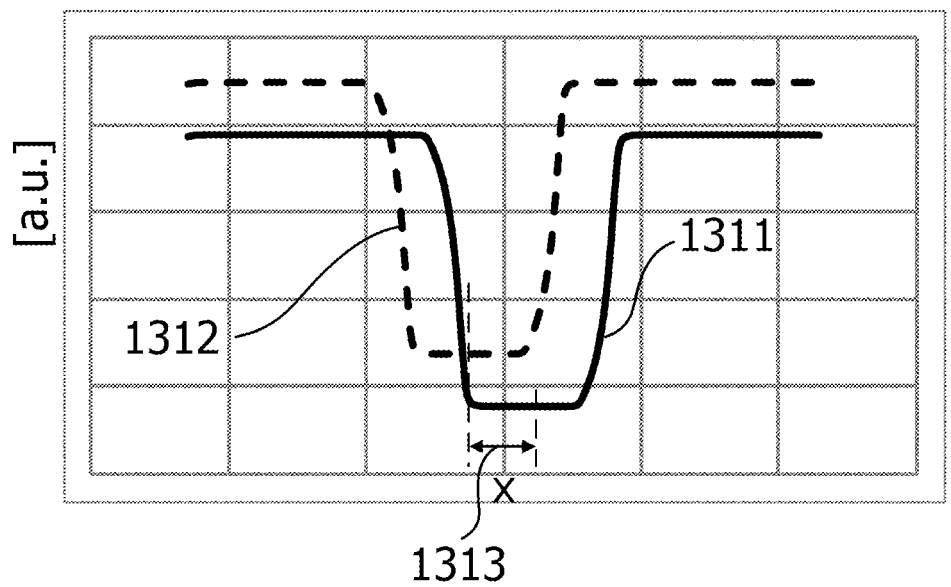

FIG. 13A and FIG. 13B indicate the output signals of two pixel lines of which aperture profiles are the same. FIG. 13A indicates output signals in which the influence of the PSF profile is not included, and indicates an object profile that is similar to the output signal in FIG. 12A. FIG. 13B indicates output signals of the first pixel line 201A and the first pixel line 202A which are constituted by pixels having the same aperture profile. These pixel lines have the same aperture profile and same PSF profile, hence the gravity center space 1313 between the output signal 1301 and the output signal 1302 becomes the same as the gravity center space 1203 of the object profiles indicated in FIG. 13A. Therefore the displacement amount included in the correction value (first displacement amount $s_1$), determined by the output signals having the same aperture profiles (PSF profiles), includes the displacement amount due to the influence of the object profile (tan θ×inter-line distance), but does not include the influence of the aperture profile.

Therefore the displacement due to the influence of the object profile caused by the line displacement of the comparing regions can be corrected by determining the parallax amount d by using the correction value (first displacement amount $s_1$) which does not include the influence of the aperture profile. Thereby, even if the aperture profiles of the pixels located above and below a pixel line, which is a reference line to calculate the correlation value (e.g. first pixel line 202A or second pixel line 203B), are different from each other, correction can be performed without include a residual error.

Second Embodiment

In Second embodiment, a case when pixels to acquire an image for viewing (full aperture pixels) exist in the image pickup element will be described.

Figure 8A:
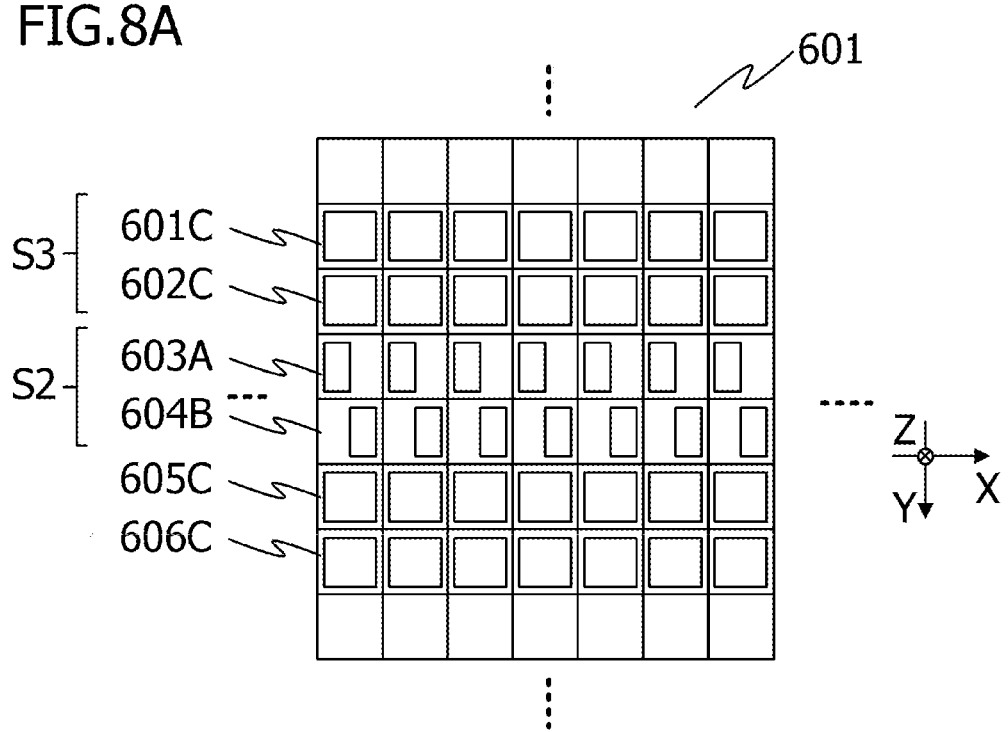
FIG. 8A and FIG. 8B are diagrams depicting an example of an image pickup element according to Second embodiment of the present invention.

FIG. 8A indicates an image pickup element 601 according to Second embodiment. The image pickup element 601 in FIG. 8A includes a first pixel line 603A where first pixels are arranged, a second pixel line 604B where second pixels are arranged, and third pixel lines 601C, 602C, 605C and 606C where third pixels, which are pixels to acquire an image for viewing, are arranged. In the other regions of the image pickup element 601, a set of four lines (third pixels lines 601C, 602C, first pixel line 603A, and second pixel line 604B) is repeatedly disposed.

Figure 8B:
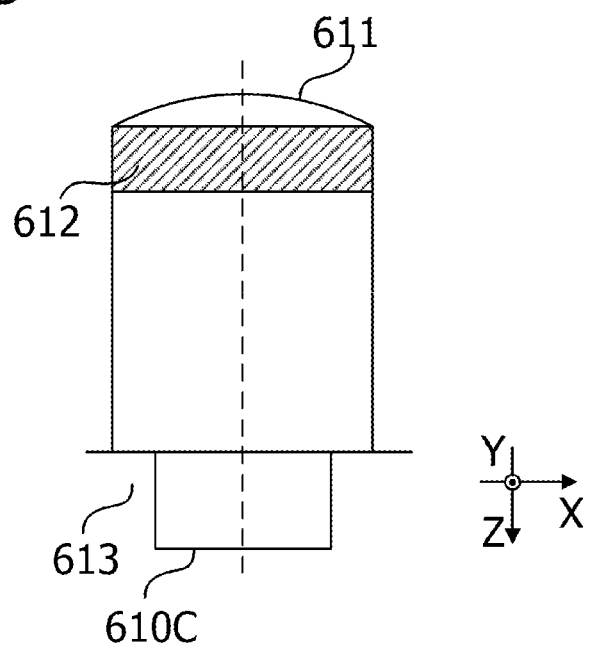

FIG. 8B is a diagram depicting a configuration of the third pixel. The third pixel includes a micro-lens 611 and a color filter 612, and forms a photoelectric converting unit 610C on a substrate 613. The photoelectric converting unit 610C generates an output signal by receiving a third beam passing through a third pupil region (a different region from first pupil region and second pupil region described above), out of the exit pupil of the imaging optical system. In Second embodiment, the third pupil region is a region that includes both the first pupil region and the second pupil region, but is not especially limited.

As mentioned above, when the second image displacement amount $s_2$ is calculated from the output signals of the first pixel line 603A and the second pixel line 604B by the correlation operation, the displacement amount, due to the line displacement of the comparing regions, is included in addition to the parallax amount d. In Second embodiment, the parallax amount d is determined by the following Expression (7) by the third image displacement amount $s_3$ acquired from the correlation values calculated by using the output signals of the third pixel lines 601C and 602C, instead of the first image displacement amount $s_1$.

$$d = s_2 - s_3 \quad (7)$$

Further, similarly to First embodiment, the method of reducing the influence of noise by using a plurality of third image displacement amounts is also preferable. In this case, the arithmetic processing unit 103 can determine the parallax amount d by the following Expression (8), by using a third image displacement amount $s_{3a}$ which is determined from the third pixel lines 601C and 602C, and a third image displacement amount $s_{3b}$ which is determined from the third pixel lines 605C and 606C.

$$d = s_2 - \frac{s_{3a} + s_{3b}}{2} \quad (8)$$

As described above, even in a configuration that includes pixels to acquire an image for viewing, the displacement amount, caused by the displacement of the lines of comparing regions from the pattern of the object, can be corrected. Further, similarly to First embodiment, while maintaining an equivalent effect, to that of the prior art, of correcting the displacement amount of correlation values, generated when the comparing regions of the images of the object are different, restrictions on the pixel arrangement on the image pickup element can be relaxed, and design flexibility to arrange pixels can be improved. Further, similarly to First embodiment, the selection of the first pixel line, the second pixel line and the third pixel line used for calculating the displacement amount may be changed. Each of the above mentioned modifications of First embodiment may be applied to Second embodiment as well.

Third Embodiment

In Third embodiment, an example of correcting the displacement amount caused by the line displacement in the comparing regions in a stereo camera will be described. In Third embodiment, two cameras are used as a distance measuring apparatus. Each camera has an image pickup element in which pixels, to acquire an image for viewing (full aperture pixels), are disposed. The distance measuring apparatus acquires the distance information based on the image signals having parallax which are outputted from the cameras respectively.

Figure 9:
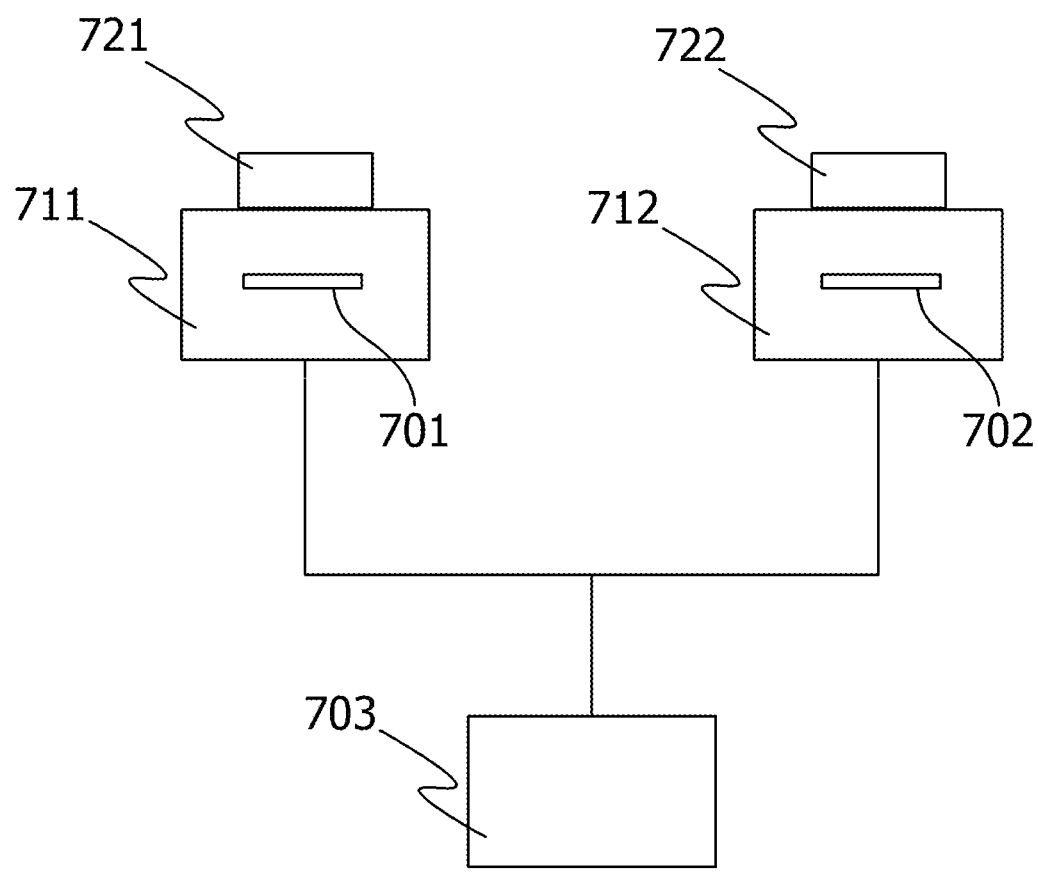
FIG. 9 is a diagram depicting a distance measuring apparatus according to Third embodiment of the present invention.

FIG. 9 is a diagram depicting a configuration of a distance measuring apparatus according to Third embodiment. The distance measuring apparatus according to Third embodiment includes two cameras 711 and 712, an arithmetic processing unit 703 (acquiring unit or arithmetic processing apparatus) that calculates the image displacement amount by processing the output signals from the cameras, among other components. The camera 711 includes a lens 721 which is a first imaging optical system, and a first image pickup element 701. The first image pickup element 701 has a first pixel line where first pixels, that receive a first beam passing through the lens 721 respectively, are arranged. In the same manner, the camera 712 includes a lens 722 which is a second imaging optical system, and a second image pickup element 702. The second image pickup element 702 has a second pixel line, where second pixels that receive a second beam passing through the lens 722 respectively, are arranged.

FIG. 10 indicates the first image pickup element 701 and a second image pickup element 702 according to Third embodiment. In Third embodiment, the arithmetic processing unit 703 calculates a second image displacement amount $s_2$ from the correlation values between the output signal of the first pixel line 812 on the first image pickup element 701 and the output signal of the second pixel line 821 on the second image pickup element 702. The arithmetic processing unit 703 also calculates a first image displacement amount $s_1$ from the correlation values between the output signals of the first pixel lines 811 and 812 on the first image pickup element 701. Then in order to correct the displacement amount caused by the line displacement of the comparing regions, the arithmetic processing unit 703 calculates the parallax amount d by using Expression (2) in the same manner as the above mentioned embodiments.

In order to reduce the influence of noise, the arithmetic processing unit 703 may calculate the parallax amount d by averaging, as mentioned above. In this case, the arithmetic processing unit 703 calculates a first image displacement amount $s_{1a}$ based on the output signals of the pixel lines 811 and 812 on the first image pickup element 701, and calculates a first image displacement amount $s_{1b}$ based on the output signals of the pixel lines 821 and 822 on the second image pickup element 702. Then the arithmetic processing unit 703 calculates the parallax amount d by using the above mentioned Expression (3).

(First Modification of Third Embodiment)
<Calculation of Correction Coefficient>

To perform more accurate correction, the displacement amount between pixel lines (inter-pixel lines) corresponding to the image pickup elements 701 and 702 may be measured in advance, and be used as a coefficient of the correction expression. This displacement amount is called the "line displacement amount" hereinbelow.

In First modification, an object, of which edges are straight lines and are inclined by θ from the vertical direction of the comparing regions, such as an object illustrated in FIG. 3, will be described as an example. First the arithmetic processing unit 703 determines an image displacement amount by capturing an image and performing the correlation operation based on the output signals thereof in a state of controlling the defocus amount (e.g. both cameras 711 and 712 are focused). Here a value, generated by subtracting the parallax amount corresponding to the controlled defocus amount (0 in this example) from the calculated image displacement amount, corresponds to the displacement amount caused by the line displacement of the comparing regions between the two cameras. The arithmetic processing unit 703 calculates the line displacement amount by dividing this value by tan θ. Then the arithmetic processing unit 703 calculates a correction coefficient k from the line displacement amount and inter-line distance. Then the arithmetic processing unit 703 calculates a parallax amount d by the following Expression (9) by using the above mentioned method.

$$\begin{cases} d = s_2 - k \times s_1 \\ d = s_2 - \dfrac{k \times (s_{1a} + s_{1b})}{2} \end{cases} \quad (9)$$

As described in First modification, by using a stereo camera, the comparing regions of the two cameras can be adjusted to the sub-pixel order, hence the distance measurement precision can be improved. The configuration of First modification is not especially limited, and a distance measuring module, which integrates the camera 711, the camera 712 and the arithmetic processing unit 703 to one package, is also preferable since handling becomes easier.

Here a pixel disposed in the image pickup element of First modification was described as a full aperture pixel, but this is not especially limited. For example, a pixel that receives a beam passing through a specific pupil region of the imaging optical system, as used in the above embodiments, may be used.

(Other)
<Modification of Pixel Arrangement>

In the description on the pixel arrangement of the image pickup element 101 in the above embodiments, the first pixel line, the second pixel line or the third pixel line are alternately disposed, as an example, but the pixel arrangement is not especially limited. For example, the first pixel line and the second pixel line may be disposed in an irregular order. It is sufficient if the arithmetic processing unit 103 can select a plurality of pixel lines which have parallax and a plurality of pixel lines which have no parallax from the pixel lines of the image pickup element 101. In this case, the method of calculating the parallax amount d is adjusted in accordance with the pixel arrangement.

<Modification of Arithmetic Processing Unit>

In FIG. 1, an example of disposing the arithmetic processing unit 103 inside the camera 110 was described, but the arithmetic processing unit 103 is not especially limited to this. For example, the camera 110 may also acquire the image signal, and an arithmetic processing apparatus, which is disposed separately from the camera 110, may acquire the distance information.

<Modification of Micro-Lens>

The micro-lens was used to divide a pupil, but the present invention is not limited to this. For example, incident light may be split by creating a wave guiding mode by using a wave guide (not illustrated). Both a micro-lens and a wave guide may be used. By this configuration, light that entered the pixel can be efficiently guided to the photoelectric converting unit, whereby a better quality distance measuring image can be acquired, and distance can be measured at higher precision.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Preferred embodiments of the present invention have been described, but the present invention is not limited to these embodiments, and may be modified and changed in various ways within the scope of the essence thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197539, filed on Oct. 11, 2017, which is hereby incorporated by reference herein in its entirety.

What is claimed is:

1. A distance measuring apparatus comprising:
   an image pickup element including a plurality of pixels, wherein the plurality of pixels are configured to receive light of an image formed by an imaging optical system and are two-dimensionally arrayed;
   a memory storing a program; and
   at least one processor executing the program to operate as:
   an acquiring unit configured to acquire information relating to a distance to an object based on an output signal of the image pickup element,
   wherein each pixel line of the image pickup element is constituted by pixels which receive beams passing through a same pupil region of the imaging optical system, and
   wherein the acquiring unit is further configured to (1) acquire a first image displacement amount from output signals of at least two pixel lines which receive beams passing through a same pupil region, (2) acquire a second image displacement amount from output signals of at least two pixel lines which receive beams passing through different pupil regions, and (3) acquire the information relating to the distance to the object based on the first image displacement amount and the second image displacement amount.

2. The distance measuring apparatus according to claim 1, wherein the image pickup element comprises a plurality of first pixel lines including a first pixel which receives a first beam passing through a first pupil region of the imaging optical system, and a second pixel lines including a second pixel which receives a second beam passing through a second pupil region of the imaging optical system, wherein the second pupil region is a region different from the first pupil region, and the acquiring unit is further configured to (1) acquire the first image displacement amount from output signals of at least two of the first pixel lines, or output signals of at least two of the second pixel lines, and (2) acquire the second image displacement amount from output signals of one of the first pixel lines and one of the second pixel lines.

3. The distance measuring apparatus according to claim 1, wherein the image pickup element comprises a plurality of first pixel lines including a first pixel which receives a first beam passing through a first pupil region of the imaging optical system, a second pixel lines including a second pixel which receives a second beam passing through a second pupil region of the imaging optical system, which is a region different from the first pupil region, and a third pixel lines including a third pixel which receives a third beam passing through a third pupil region of the imaging optical system, wherein the third pupil region is a region different from the first pupil region and the second pupil region, and the acquiring unit is further configured to (1) acquire the first image displacement amount from output signals of at least two of the third pixel lines, and (2) acquire the second image displacement amount from output signals of one of the first pixel lines and one of the second pixel lines.

4. The distance measuring apparatus according to claim 1, wherein the image pickup element includes a first image pickup element configured to receive light of an image formed by a first imaging optical system, and a second image pickup element configured to receive light of an image formed by a second imaging optical system, and wherein the acquiring unit is further configured to (1) acquire the first image displacement amount from output signals of pixel lines included in the first image pickup element or output signals of pixel lines included in the second image pickup element, and (2) acquire the second image displacement amount from a pixel line included in the first image pickup element and a pixel line included in the second image pickup element.

5. The distance measuring apparatus according to claim 4, wherein the acquiring unit is further configured to (1) determine, as a correction coefficient in advance, a line displacement amount between pixel lines due to the inclination of the object, based on an angle of an edge component of the object, and (2) acquire the distance information by using a value determined by subtracting, from the second image displacement amount, the first image displacement amount multiplied by the correction coefficient.

6. The distance measuring apparatus according to claim 1, wherein the acquiring unit is further configured to acquire the first image displacement amount or the second image displacement amount from output signals of adjacent pixel lines.

7. The distance measuring apparatus according to claim 1, wherein the acquiring unit is further configured to (1) acquire the second image displacement amount from output signals of adjacent pixel lines, and (2) acquire the first image displacement amount from output signals of a plurality of pixel lines including the pixel lines used for calculating the second image displacement amount.

8. The distance measuring apparatus according to claim 1, wherein the acquiring unit is further configured to acquire the distance information by using a value determined by subtracting the first image displacement amount from the second image displacement amount.

9. The distance measuring apparatus according to claim 1, wherein the acquiring unit is further configured to (1) acquire a plurality of first image displacement amounts, and (2) acquire the distance information by using a value determined by subtracting an average value of the plurality of first image displacement amounts from the second image displacement amount.

10. The distance measuring apparatus according to claim 9, wherein the plurality of first image displacement amounts include a first image displacement amount which is determined from output signals of pixel lines located above the pixel line used for calculating the second image displacement amount, and a first image displacement amount which is determined from output signals of pixel lines located below the pixel line used for calculating the second image displacement amount.

11. The distance measuring apparatus according to claim 9, wherein the plurality of first image displacement amounts include at least two first image displacement amounts determined from output signals of pixel lines disposed continuously from the pixel line used for acquiring the second image displacement amount.

12. The distance measuring apparatus according to claim 1, wherein the acquiring unit is further configured to acquire the distance information by using a value generated by dividing the first image displacement amount by a value determined from a line space of the pixel lines used for calculating the first image displacement amount and the line space of the pixel lines used for calculating the second image displacement amount.

13. The distance measuring apparatus according to claim 1, wherein the acquiring unit is further configured to correct, from the second image displacement amount, an image displacement error caused by a difference of light-receiving sensitivity characteristics of a pixel.

14. A distance measuring method comprising:
acquiring an output signal of an image pickup element including a plurality of pixels, wherein the plurality of pixels are configured to receive light of an image formed by an imaging optical system and are two-dimensionally arrayed, and each pixel line is constituted by pixels which receive beams passing through a same pixel region of the imaging optical system;

acquiring a first image displacement amount from output signals of at least two pixel lines which receive beams passing through a same pupil region;

acquiring a second image displacement amount from output signals of at least two pixel lines which receive beams passing through different pupil regions; and determining information relating to a distance to an object based on the first image displacement amount and the second displacement amount.

15. A non-transitory computer readable medium that stores a program, wherein the program causes a computer to execute: a distance measuring method comprising:
acquiring an output signal of an image pickup element including a plurality of pixels, wherein the plurality of pixels are configured to receive light of an image formed by an imaging optical system and are two-dimensionally arrayed, and each pixel line is constituted by pixels which receive beams passing through a same pixel region of the imaging optical system;

acquiring a first image displacement amount from output signals of at least two pixel lines which receive beams passing through a same pupil region;

acquiring a second image displacement amount from output signals of at least two pixel lines which receive beams passing through different pupil regions; and determining information relating to a distance to an object based on the first image displacement amount and the second displacement amount.

\* \* \* \* \*